May 12, 1964 R. L. THARP 3,132,842
TURBINE BUCKET SUPPORTING STRUCTURE
Filed April 13, 1962 2 Sheets-Sheet 1
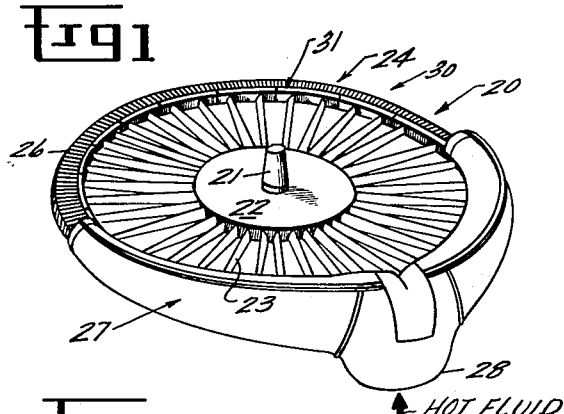
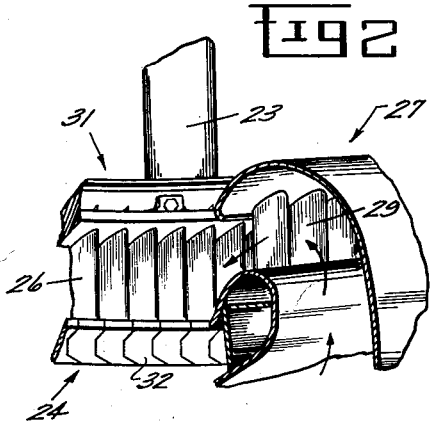
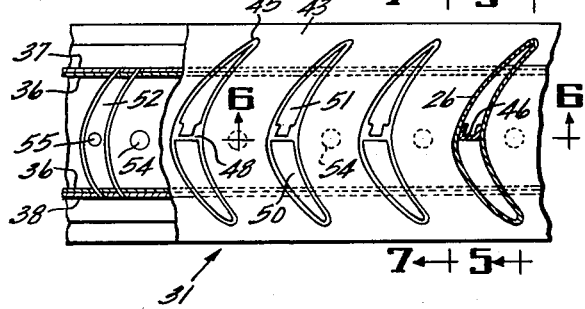
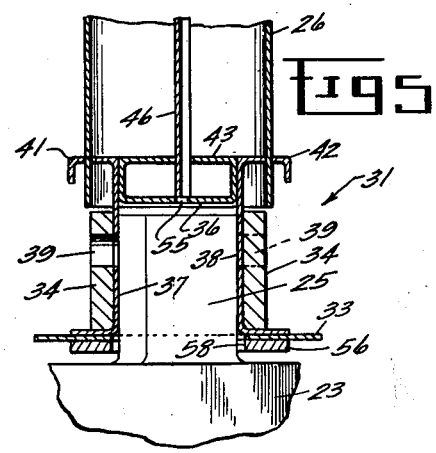
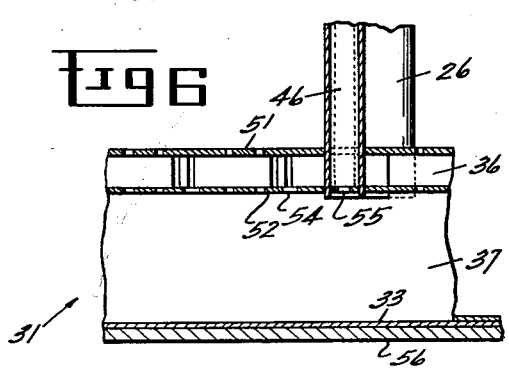
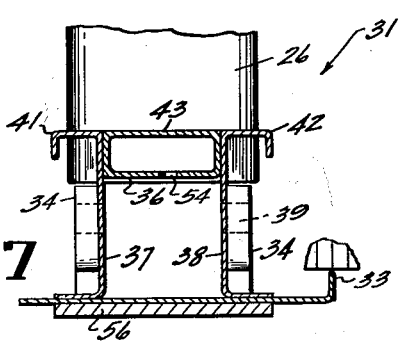
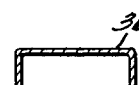
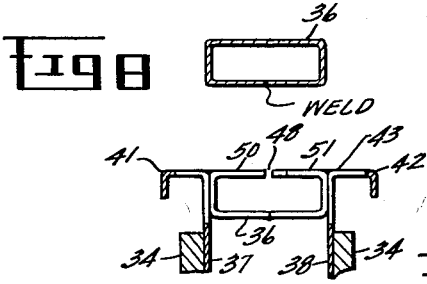
INVENTOR.
ROBERT L. THARP
BY
ATTORNEY May 12, 1964 R. L. THARP 3,132,842
TURBINE BUCKET SUPPORTING STRUCTURE
Filed April 13, 1962 2 Sheets-Sheet 2
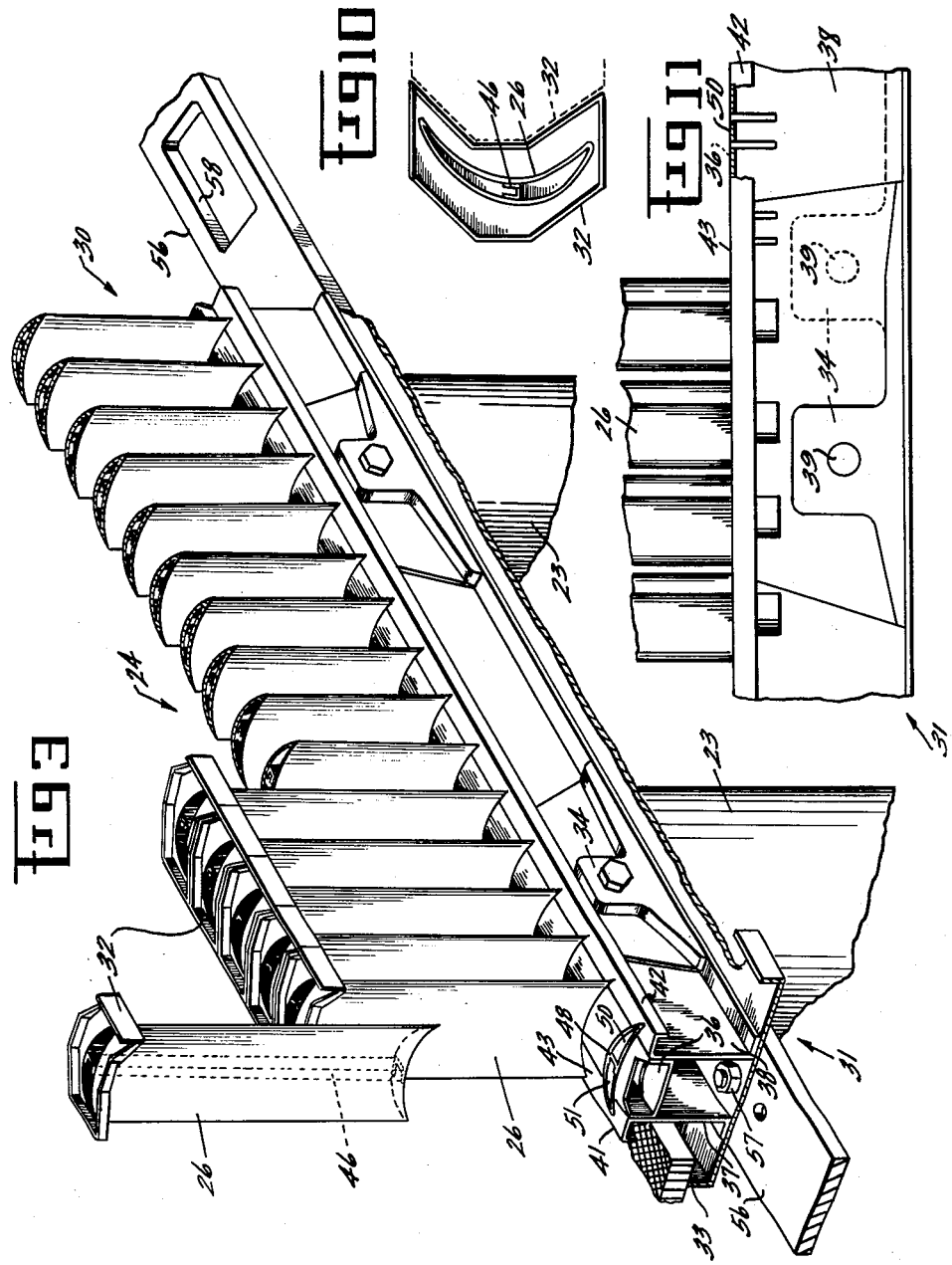
INVENTOR.
ROBERT L. THARP
BY
John F. Cullen
ATTORNEY United States Patent Office 3,132,842
Patented May 12, 1964

3,132,842
TURBINE BUCKET SUPPORTING STRUCTURE
Robert L. Tharp, Wyoming, Ohio, assignor to General Electric Company, a corporation of New York
Filed Apr. 13, 1962, Ser. No. 187,245
7 Claims. (Cl. 253—77)

This invention relates generally to turbine rotors and, more particularly, to an improved means for securing hollow turbine buckets to a turbine rotor.

In aircraft turbine engines it is always desirable to reduce weight. In the past, many ways have been pursued to reduce aircraft engine weight and these have included hollowing out structural members so that their outer dimensions and airfoil characteristics are unchanged while the unnecessary internal mass is removed. An example of this is the use of hollow turbine brackets which have the peripheral airfoil characteristics of solid buckets with significantly less weight. The use of hollow turbine buckets presents a problem with regard to avoiding structural weaknesses both in the bucket itself and in the area joining the bucket to its supporting structure. Further attempts have been made in the past to lighten other structural elements of aircraft turbine engines, such as the turbine bucket supporting structure. Such attempts have met with limited success due to the aforementioned structural weakness concomitant with the reduction of the mass of the structure.

It is an object of this invention to provide an improved means for securing a hollow turbine bucket to a turbine bucket supporting structure.

It is a further object of this invention to provide an improved lightweight turbine bucket supporting structure.

Briefly stated, in accordance with one aspect of the invention, a supporting structure for securing hollow turbine buckets to a rotor is provided with a central hollow box member having a cross section defined by first and second long sides essentially parallel to each other and first and second short sides essentially parallel to each other. A first side-rail is secured to the first short side of the box member and has an outwardly projecting flange lying in a plane common to the first long side of the box member. A second side-rail is secured to the second short side of the box member and has an outwardly projecting flange also lying in a plane common to the first long side of the box member. A plurality of slot patterns extend through the box member and into the side-rails and are each adapted to receive a turbine bucket. Each of the slot patterns has a configuration essentially identical to the cross sectional configuration of the turbine bucket. Means are also provided to connect the side-rails to a rotor member such as, for example, a rotatable fan element.

While the specification concludes with claims particularly pointing out and distinctly claiming the subject matter which is regarded as the invention, it is believed the invention will be better understood from the following description taken in connection with the accompanying drawings, in which:

FIGURE 1 is a perspective view of a lift fan driven by a tip turbine which is secured to the fan by means of the present invention;

FIGURE 2 is an enlarged fragmentary perspective view illustrating the relationship of the scroll to the tip turbine of FIGURE 1;

FIGURE 3 is a fragmentary view partially exploded illustrating the tip turbine assembly in detail;

FIGURE 4 is a top plan view of the turbine bucket supporting structure, partially broken away, illustrating the slot pattern configurations;

FIGURE 5 is a sectional view along the line 5—5 of FIGURE 4;

FIGURE 6 is a fragmentary sectional view along line 6—6 of FIGURE 4;

FIGURE 7 is a sectional view along line 7—7 of FIGURE 4;

FIGURE 8 is an end view of the box member of the turbine bucket supporting structure;

FIGURE 9 is a fragmentary sectional view similar to FIGURE 5 but with the turbine bucket removed;

FIGURE 10 is a detailed top plan view of the turbine bucket shroud; and

FIGURE 11 is a fragmentary side view of the invention, partially broken away.

Referring to the drawings and particularly to FIGURES 1 and 2, there is illustrated a lift fan 20 which may be employed in the wing or fuselage of an aircraft (not shown) to enable the aircraft to take off vertically. The lift fan 20 rotates about a short shaft 21 which has secured thereto a rotatable hub 22. Extending radially outwardly from the outer periphery of the hub 22 are a plurality of fan blades 23. The fan blades 23 exert a lifting force on the aircraft as they propel air downwardly along the fan axis. In order to exert a rotary force to the fan blades, a segmental tip turbine assembly 24 circumscribes the outer ends of the fan blades 23. The tip turbine assembly 24 comprises a plurality of turbine buckets 26, as best illustrated in FIGURE 2. Hot fluid, originating from a prime mover (not shown), enters a scroll 27 through inlet 28 (FIGURE 1). The hot fluid leaves the scroll 27 through stator blades 29 whereupon it passes through the tip turbine assembly 24 to drive the lift fan 20.

Referring now to FIGURE 3, there is illustrated one segment 30 of the segmental tip turbine assembly 24. In the preferred embodiment of the lift fan assembly, the segmental tip turbine assembly 24 is formed from a plurality of segments wherein each segment spans at least two fan blades 23 for rigidity and balance and each segment comprises approximately sixteen turbine buckets 26. Each segment 30 of the segmental tip turbine assembly 24 comprises a turbine bucket supporting structure 31, a plurality of turbine buckets 26 extending radially outwardly therefrom, a turbine bucket shroud member 32 secured to the outer end of each turbine bucket, a seal member 33, and four side plates 34, two on each side of the supporting structure 31, which facilitate attachment of the turbine bucket supporting structure to the outer ends of the fan blades 23. The preferred structure and exact function of each of these elements will be hereinafter more fully discussed.

Referring now to FIGURES 4-8, there is illustrated in accordance with the invention, means for securing the turbine buckets 26 to the turbine bucket supporting structure 31. Also, in accordance with the invention, FIG- URES 4-8 illustrate the detailed construction of the turbine bucket supporting structure 31. The turbine bucket supporting structure 31 comprises a central hollow box member 36 which is formed from a piece of sheet metal, preferably a material to withstand the elevated temperatures to which the assembly is exposed, by bending the sheet metal four times to form long and short parallel sides and brazing or welding the member along its length as shown in FIGURE 8. To respective sides of the box member 36 are brazed side-rails 37 and 38 (FIGURES 5 and 7), each of which is also formed by bending a piece of sheet metal four times to give the metal a generally C-shaped cross section. The side-rails 37 and 38 are secured to the box member 36 preferably by brazing although any suitable means would be within the scope of the present invention. The box member 36 and the side-rails 37 and 38 are formed in lengths equal to the length of a segment 30 of the segmental tip turbine assembly 24.

As discussed earlier, the preferred embodiment of the present invention employs a segmental tip turbine assembly wherein each segment 30 is of a length sufficient to span two fan blades 23. In accordance with this embodiment, there are provided on each side-rail 37 and 38 of each segment 30, two side plates 34 to facilitate the securing of the turbine bucket supporting structure 31 to the outer ends of fan blades 23.

The primary purpose of the side plates 34 is to give added thickness to the side-rails 37 and 38 at the point where the fan blades 23 are secured thereto by bolts or equivalent not shown. The side plates 34 provide this added thickness without the addition of unnecessary thickness between the actual points where the fan blades 23 are secured to the turbine bucket supporting structure 31. The side plates 34 may be secured to the side-rails 37 and 38 by any suitable means, and in the preferred embodiment of the present invention, by brazing. Since the fan blades 23 are pitched to provide a lifting force, the outer ends have tangs 25 (FIGURE 5) which are similarly pitched. For this reason the holes 39 which extend through the side plates 34 and the side-rails 37 and 38 are not in transverse axial alignment but are offset. This feature is best shown in FIGURE 11. As can be seen from FIGURES 5 and 7, the outward flanges 41 and 42 of side-rails 37 and 38, respectively, lie in the same plane as the outer surface of box member 36 to form a plane common surface 43 therewith.

Referring now to FIGURE 4, there is illustrated a radially inward view of surface 43 which, in accordance with the present invention, is provided with a plurality of slot patterns 45. Each slot pattern 45 is adapted to receive one hollow turbine bucket 26. As can be seen in FIGURE 9, the slot patterns 45 extend into side-rails 37 and 38 to a depth slightly beyond the inner surface of box member 36.

As mentioned earlier, one purpose of the present invention is to provide a lightweight structuer and one means for achieving this purpose is to employ hollow turbine buckets. In some circumstances it is desirable to reinforce the hollow turbine bucket with a center supporting rib 46 (FIGURES 4–6) to assist in absorbing bending forces applied to the turbine buckets. As can be seen in FIGURE 4 the slot patterns include a continuous outer peripheral slot, which conforms essentially identically to the cross section of the hollow turbine bucket 26 and a transverse slot 48 which is positioned generally in the central area of the slot pattern and is adapted to receive the center supporting rib 46.

In assembling the turbine bucket supporting structure 31, the box member 36 is formed and brazed, and the side-rails 37 and 38 are formed as described above. The side-rails 37 and 38 are then brazed, or secured by other suitable means, to the box member 36 as discussed above. An electric discharge cutting tool having a cross sectional configuration essentially identical to the slot pattern configuration may be employed to cut the slot patterns by slowly moving the cutting tool radially inward of the turbine bucket supporting structure 31 to a depth sufficient to provide a slot pattern extending through the surface 43, and into the side-rails 37 and 38 through the lower surface of the box member 36. In the preferred method of cutting the slot pattern 45, an electric discharge cutting tool is employed. It should be noted, however, that any suitable cutting means may be employed as long as the slot patterns conform to the configurations herein described.

In order to strengthen the hollow turbine bucket 26, the slot patterns 45 of the present invention provide internal supporting means for the turbine bucket at the planes of the surface 43 and the inward surface of the box member 36, at which points a resisting moment to the bucket air loads is present. The internal supporting means provided by the present invention thus take the form of webs or upstanding platforms 50 and 51 in the surface 43 surrounded by the above-mentioned slot 45 and a similar web 52 in the lower surface of box member 36 as seen in FIGURE 4. Webs 50, 51, and 52 are integral with the turbine bucket supporting structure 31 at the side-rails 37 and 38, respectively, as shown in FIGURE 6. After the turbine bucket supporting structure 31 has been assembled and the slot patterns have been cut, the individual turbine buckets are inserted into their respective slots along with the supporting rib 46 and the turbine buckets and ribs are brazed to the supporting structure 31. The webs 50, 51, and 52 are brazed to the internal surfaces of the turbine buckets 26 at all accessible contiguous points. Therefore, once the brazing has taken place, the individual turbine buckets 26 are provided with an internal supporting means in the plane of surface 43 as well as the plane of the lower surface of box member 36 to provide an integral structure.

In addition to the slot patterns 45, a plurality of holes 54 (FIGURES 4 and 7) are cut or punched through the lower surface of box member 36 in the area between adjacent turbine buckets 26 and a hole 55 is punched or cut through web 52. These holes provide pressure equalization in the brazing operation and a means through which the braze on the inside of box section 36 may be inspected.

FIGURES 3 and 10 best illustrates the turbine bucket shroud member 32 employed in the preferred embodiment of the present invention. FIGURE 10 in particular illustrates the cross sectional configuration of the shroud member 32 which slips over the outer end of the hollow turbine bucket 26 to be brazed thereto. The shroud member 32 has a modified crescent shape when viewed from above with the curved sides formed from a plurality of short straight segments. The adjacent shroud members are not secured to each other but are given slight clearance as indicated by the dashed line in FIGURE 10 to form a segmented shroud structure. In this manner, adjacent turbine buckets and shroud members serve as mutual vibration dampers.

The aforementioned seal member 33 is not critical to the present invention but is employed in the preferred embodiment to provide a seal between the turbine and compressor gas streams and also a smooth airflow surface at the outer ends of the fan blades 23 where they join with the turbine bucket supporting structure 31.

In the preferred embodiment of the present invention a partial scroll 27 is employed, i.e., the scroll 27 extends only partially around the periphery of the lift fan 20. It should be understood that a complete annular scroll, i.e., one that extends completely around the periphery of the lift fan 20, would be equally compatible with the invention. When a partial scroll is employed, and it is employed in this instance for space accommodations, torque must be transmitted to fan blades 23 some of which are not directly below the turbine buckets in the partial scroll 27. To assist in transmitting this torque, annular torque ring 56 is provided as shown in FIGURES 3, 5, and 7 to interconnect each of the segments 30 (FIGURE 3). The torque ring 56 is attached to the segments 30 by means of bolts 57 and holes or cut out 58 are provided in the torque ring 56 to loosely accept the tangs 25 of the fan blades 23. Thus, torque is transmitted from turbine segments 30 to the fan blades by securing bolts or equivalent attaching the tangs to the side plates 34 of supporting structure 31. The rotating forces generated by the hot fluid from the scroll 27 coming into contact with the turbine buckets adjacent the scroll 27, are distributed over all the segments 30 by the torque ring 56.

As will be evident from the foregoing description, certain aspects of the invention are not limited to the particular details of the construction of the example illustrated, and it is contemplated that various and other modifications or applications will occur to those skilled in the art. It is therefore intended that the appended claims shall cover such modifications and applications as do not depart from the true spirit and scope of the invention.

What is claimed as new and desired to be secured by Letters Patent of the United States is:

1. A supporting structure for securing hollow turbine buckets to a rotor or the like comprising:
    (a) a central hollow box member having a cross section defined by first and second long sides essentially parallel to each other and first and second short sides essentially parallel to each other,
    (b) a first side-rail secured to said first short side of said box member and having an outwardly projecting flange lying in a plane common to said first long side of said box member,
    (c) a second side-rail secured to said second short side of said box member and having an outwardly projecting flange lying in a plane common to said first long side of said box member,
    (d) at least one pattern of slots adapted to receive a turbine bucket extending into said box member and said side-rails,
    (e) each of said patterns of slots having a configuration essentially identical to the cross sectional configuration of the turbine bucket, and
    (f) means to connect said side-rails to a rotor or the like.

2. Apparatus as described in claim 1 in which the box member and side-rails are formed of sheet metal and the means to connect said side-rails to the rotor includes at least one side plate secured to said side-rails.

3. In combination,
    (a) a rotatable hub member,
    (b) a plurality of fan blades extending radially outward from said hub member and secured thereto,
    (c) a turbine bucket supporting structure circumscribing the outer ends of said fan blades and secured thereto comprising;
        (aa) a central hollow box member having a cross section defined by first and second long sides essentially parallel to each other and first and second short sides essentially parallel to each other,
        (bb) a first side-rail secured to said first short side of said box member and having an outwardly projecting flange lying in a plane common to said first long side of said box member,
        (cc) a second side-rail secured to said second short side of said box member and having an outwardly projecting flange lying in a plane common to said first long side of said box member,
        (dd) at least one pattern of slots adapted to receive a turbine bucket extending into said box member and said side-rails,
        (ee) each of said patterns of slots having a configuration essentially identical to the cross sectional configuration of the turbine bucket, and
        (ff) means to connect said side-rails to the outer ends of said fan blades,
    (d) a turbine bucket positioned within each of said patterns of slots and secured to said turbine bucket supporting structure, and
    (e) a segmental shroud circumscribing the outer ends of said turbine buckets.

4. The invention defined in claim 3 wherein the turbine bucket supporting structure is segmental.

5. The invention defined in claim 4 wherein each segment of the segmental turbine bucket supporting structure spans at least two fan blades.

6. The invention defined in claim 5 wherein the adjacent segments of the segmental turbine bucket supporting structure are secured to each other by an annular torque ring.

7. In combination,
    (a) a rotatable hub member,
    (b) a plurality of fan blades extending radially outward from said hub member and secured thereto,
    (c) a turbine bucket supporting structure circumscribing the outer ends of said fan blades and secured thereto comprising;
        (aa) a central hollow box member having a cross section defined by first and second long sides essentially parallel to each other and first and second short sides essentially parallel to each other,
        (bb) a first side-rail secured to said first short side of said box member and having an outwardly projecting flange lying in a plane common to said first long side of said box member,
        (cc) a second side-rail secured to said second short side of said box member and having an outwardly projecting flange lying in a plane common to said first long side of said box member,
        (dd) at least one pattern of slots adapted to receive a turbine bucket extending into said box member and said side-rails,
        (ee) each of said patterns of slots having a peripheral configuration essentially identical to the cross sectional configuration of the turbine bucket and a transverse slot adapted to receive a supporting rib positioned within the turbine bucket, and
        (ff) means to connect said side-rails to the outer ends of said fan blades,
    (d) a turbine bucket positioned within each of said patterns of slots and secured to said turbine bucket supporting structure,
    (e) a supporting rib extending from within each of said turbine buckets into each of said transverse slots and secured to said turbine bucket supporting structure, and
    (f) a segmental shroud circumscribing the outer ends of said turbine buckets.

References Cited in the file of this patent

UNITED STATES PATENTS

| | | |
|---|---|---|
| 2,430,140 | Phelan et al. | Nov. 4, 1947 |
| 2,618,120 | Papini | Nov. 18, 1952 |
| 2,641,040 | Goddard | June 9, 1953 |
| 2,771,622 | Thorp | Nov. 27, 1956 |

FOREIGN PATENTS

| | | |
|---|---|---|
| 249,036 | Italy | June 26, 1926 |
| 216,766 | Switzerland | Jan. 5, 1942 |